United States Patent
Russ et al.

(10) Patent No.: US 12,518,591 B2
(45) Date of Patent: Jan. 6, 2026

(54) SYSTEM, DEVICE, AND METHOD FOR MANY-TO-MANY DEVICE CONNECTIVITY

(71) Applicant: IGT, Las Vegas, NV (US)

(72) Inventors: Michael Russ, Graz (AT); David Froy, Lakeville-Westmorland (CA); Stefan Keilwert, St. Josef (AT); Soheil Latifi, Moncton (CA)

(73) Assignee: IGT, Las Vegas, NV (US)

( * ) Notice: Subject to any disclaimer, the term of this patent is extended or adjusted under 35 U.S.C. 154(b) by 261 days.

(21) Appl. No.: 18/215,329

(22) Filed: Jun. 28, 2023

(65) Prior Publication Data
US 2025/0005997 A1    Jan. 2, 2025

(51) Int. Cl.
*G07F 17/32*    (2006.01)
*H04W 84/18*    (2009.01)

(52) U.S. Cl.
CPC ...... *G07F 17/3223* (2013.01); *G07F 17/3258* (2013.01); *H04W 84/18* (2013.01)

(58) Field of Classification Search
CPC . G07F 17/3223; G07F 17/3258; H04W 84/18
See application file for complete search history.

(56) References Cited

U.S. PATENT DOCUMENTS

| | | | |
|---|---|---|---|
| 8,172,684 B2 | 5/2012 | Adiraju et al. | |
| 8,506,395 B2 | 8/2013 | Bytnar et al. | |
| 9,483,905 B2 | 11/2016 | Oberberger et al. | |
| 9,728,039 B2 | 8/2017 | Warner et al. | |
| 11,368,388 B2 | 6/2022 | Ishikawa | |
| 2006/0009285 A1* | 1/2006 | Pryzby | G07F 17/32 463/30 |
| 2010/0311505 A1* | 12/2010 | Oberberger | H04L 45/24 463/29 |
| 2013/0053135 A1 | 2/2013 | King | |
| 2023/0147030 A1* | 5/2023 | Sharma | G07F 17/3241 463/25 |
| 2023/0334040 A1* | 10/2023 | Sealey | G06F 16/2379 |

* cited by examiner

*Primary Examiner* — Werner G Garner
(74) *Attorney, Agent, or Firm* — Sheridan Ross P.C.

(57) ABSTRACT

A system, method, and device may operate an intelligent mesh network. The method may include configuring the intelligent mesh network, wherein the intelligent mesh network comprises a plurality of nodes, and wherein the plurality of nodes are able to communicate directly with each other. The method may also include detecting an in-game event on a first node in the intelligent mesh network; and in response to detecting the in-game event, performing an action on a second node, wherein the action is associated with the in-game event, and wherein the second node is in a location near a location of the first node.

20 Claims, 6 Drawing Sheets

SYSTEM, DEVICE, AND METHOD FOR MANY-TO-MANY DEVICE CONNECTIVITY

BACKGROUND

The present disclosure is generally directed toward gaming machines and, in particular, toward many-to-many gaming machine connectivity within a casino environment.

Electronic gaming machines (EGMs) are used for various gameplay, such as video poker, slot games, keno, and the like. EGMs are usually situated throughout a casino and next to other EGMs (e.g., a bank of machines). The floor/layout of a casino may be separated into different regions, with different types of games/EGMs located in different regions. Additionally, a casino may have electronic signage, such as lighted signs that indicate the type of machines in an area.

BRIEF SUMMARY

The invention describes many-to-many gaming machine connectivity within a casino environment, where devices (e.g., EGMs, signage, sensors, etc.) are directly connected to each other wirelessly, without requiring a central access point (e.g., a Wi-Fi router). Through direct communication, everything remains local, which is especially relevant for devices (e.g., EGMs) where security exposures must be avoided. In addition to significantly valuable gaming features, the present disclosure provides security for the connected devices. For example, devices may only be connected to other devices within a specified region (e.g., geographic location, within a radius of a machine, etc.) and/or of a similar type, rather than connecting all devices throughout the entire casino. For example, security measures may include firewall whitelisting of MAC network addresses or IP addresses of devices or geographical whitelisting based on device IP. In embodiments, end-to-end encryption (e.g., SSL, TSL or other technologies) is provided for communication between connected devices. In embodiments, Multi-Factor Authentication (MFA) is required to access secure nodes (e.g., authenticate on both the gaming machine and the mobile device. Mobile device authentication may include biometric authentication).

For example, a bank of video poker machines may be connected, but those video poker machines may not be connected to a bank of slot machines that is nearby (different types of gaming machines). In another example, the video poker machines may not be connected to EGMs (of the same or different type) that are located in a different area of the casino (different geographic area). In embodiments, devices may be somewhat intelligent and communication between devices may be range-limited.

In embodiments, where a first node (e.g., an unsecure node) tries to request a feature that it should not have access to (e.g., attack vector, or threat vector) from a second node, the first node may be blacklisted by the second node it is making the requests to. If a node is connected to the blacklisted node, then it should find an alternative node to connect to and drop the blacklisted node. A node that blacklists a rouge node, could propagate the possible blacklisted node to the other nodes, so the network can heal around the bad node.

A similar process could heal the network around an unresponsive node or a node that does not communicate correctly with the protocol being used for node-to-node communication (e.g., there is still a connection between nodes, but one of the nodes is having software issues/problems and not working correctly, or has crashed). The unresponsive/malfunctioning node could be added to the blacklist and shared with other nodes on the mesh network. In embodiments, a log of detected bad nodes may be reviewed and action taken to identify the bad node, which can either be replaced or updated (e.g., the firmware on the node). Once the unresponsive/malfunctioning node is corrected, it may notify the other nodes (e.g., transmit a signal), for them to try connecting again. If the previously unresponsive/malfunctioning node responds correctly, it can be un-blacklisted. In another embodiment, the ID of the bad node is replaced in a firmware update that fixes the issue so that the other nodes are able to discover the "new" device and try to allow it back into the mesh network.

In embodiments, there may be a set of meta data tags for the capabilities of the nodes, the meta data tags may indicate what features and services each respective node has to offer. The meta data may be transmitted by a node, requested from a node by another node, or both. For example, when node A broadcasts its availability, it could also broadcast a list of features that it supports; other nodes receiving the broadcast may store the meta data along with the ID of node A. In another example, when a device attempts to connect to a node or scans to discover new nodes, the device attempting to connect/scanning could request from each node a list of features that the respective node supports, and store that meta data along with the ID of the respective node. Then when a feature/service is requested/needed, the stored meta data could be used to lookup which node(s) have the requested or needed feature/service. Additionally, or alternatively, if a feature on node B breaks or becomes unavailable, the meta data associated with node B could be temporally changed and propagated to other devices on the mesh network indicating that the feature is no longer available on node b. For example, if a EGM supports printing and accepting tickets, but the printer becomes jammed, the printer meta data could be removed from the EGM feature list, and an update message could be sent out to connected devices indicating the EGM's state has changed. The other nodes may then proceed to use a different node with the printer capability available, until the paper jam is corrected on the EGM, at which point, the meta data would be once again updated with the printer feature/service being available again, and an update message could be sent out to connected devices indicating the EGM's state has changed.

In certain embodiments, the present disclosure relates to an intelligent mesh network system, device, and method used to provide many-to-many connectivity for devices in a casino. In some embodiments, a system is provided that includes: a processor; and a memory coupled with and readable by the processor and storing therein a set of instructions which, when executed by the processor, cause the processor to: configure an intelligent mesh network, wherein the intelligent mesh network comprises a plurality of nodes, and wherein each of the plurality of nodes is able to communicate directly with other nodes in the plurality of nodes; detect an in-game event on a first node in the intelligent mesh network; and in response to detecting the in-game event, perform an action on a second node near the first node, wherein the action is associated with the in-game event.

In some embodiments a method of operating an intelligent mesh network, the method includes: configuring the intelligent mesh network, wherein the intelligent mesh network comprises a plurality of nodes, and wherein the plurality of nodes are able to communicate directly with each other; detecting an in-game event on a first node in the intelligent mesh network; and in response to detecting the in-game event, performing an action on a second node, wherein the action is associated with the in-game event, and wherein the second node is in a location near a location of the first node.

In some embodiments, controller is provided that includes a processor; and a memory coupled with and readable by the processor and storing therein a set of instructions which, when executed by the processor, causes the processor to: detect an in-game event on a first node in the intelligent mesh network; and in response to detecting the in-game event on the first node, perform an action on a second node, wherein the second node is in a location near a location of the first node.

Any of the above example aspects include wherein a node comprises an electronic gaming machine, electronic signage, an operator device, or a sensor.

Any of the above example aspects include wherein the first node comprises an electronic gaming machine, wherein the in-game event comprises a jackpot on the electronic gaming machine, and wherein performing the action in response to detecting the jackpot on the electronic gaming machine comprises activating lights and/or speakers on adjacent electronic gaming machines.

Any of the above example aspects include detecting a node is not in use; and using the node not in use for microprocessing.

Any of the above example aspects include wherein the microprocessing comprises a random number generator.

Any of the above example aspects include detecting failure of a node; and shifting functions performed by the failed node to a backup node.

Any of the above example aspects include wherein each node on the intelligent mesh network has a respective view of the intelligent mesh network.

Any of the above example aspects include detecting a location of a mobile device; and performing a second action on a static node that is near the location of the mobile device.

Any of the above example aspects include wherein performing the action in response to detecting the in-game event comprises performing the action on other nodes in a location near the first node associated with the in-game event.

Any of the above example aspects include wherein the plurality of nodes comprise secure nodes and unsecure nodes, and wherein the secure nodes are configured to limit access/permissions to the secure nodes by the unsecure nodes.

Any of the above example aspects include wherein the plurality of nodes comprise secure nodes and unsecure nodes, and wherein the secure nodes have different granted access rights/permissions within the intelligent mesh network than the unsecure nodes.

Any of the above example aspects include wherein nodes may be grouped in a node group based on geographic location, and wherein the intelligent mesh network may treat each node group as an individual node.

Any of the above example aspects include determining a node is idle; and using the idle node as a random number generator.

Any of the above example aspects include detecting a failure of a node; and shifting functions performed by the failed node to a backup node.

Any of the above example aspects include wherein each node on the intelligent mesh network has a respective view of the intelligent mesh network.

Any of the above example aspects include detecting a location of a mobile device; and performing a second action on a static node that is near the location of the mobile device.

Any of the above example aspects include wherein the first node comprises an electronic gaming machine, wherein the in-game event comprises a jackpot on the electronic gaming machine, and wherein performing the action in response to detecting the jackpot on the electronic gaming machine comprises activating lights and/or speakers on adjacent electronic gaming machines.

Additional features and advantages are described herein and will be apparent from the following Description and the figures.

DETAILED DESCRIPTION

Embodiments of the present disclosure will be described in connection with FIGS. 1-6. While certain embodiments of the present disclosure will reference the use of a mobile device, such as a smartphone that communicates with casino devices, it should be appreciated that embodiments of the present disclosure are not so limited. For instance, any computing device, or collection of computing devices may be used to facilitate the many-to-many connectivity as described herein.

This invention describes many-to-many connectivity of devices in a casino environment, where a local device is directly connected wirelessly to other devices, without requiring a central access point, such as a Wi-Fi router. The result is a many-to-many device connectivity system instead of a many-to-one (e.g., router system) or a one-to-one system (e.g., BLUETOOTH®) system. In embodiments, nodes may need to qualify (e.g., satisfy a condition or have a characteristic) to be detected by other nodes. Additionally, or alternatively, nodes may only be detectable by other nodes of the same kind (e.g., nodes that manage game events, nodes that manage audio events etc.).

Multiple gaming features and operator advantages may be realized using many-to-many connectivity. By connecting devices directly (e.g., devices 112, 114, 116, 117, and 116), the system can limit the number (and possibly the type) of controllers. For example, it is not necessary to have a separate controller for every type of component (e.g., signage/merchandise controller, Wi-Fi router, network controller, etc.) in the casino. A direct connection between devices is also more resistant to Internet connectivity issues (e.g., downtimes when router is having issues).

Devices that may be directly connected include, but are not limited to a casino's electronic gaming devices (e.g., electronic gaming machines, electronic table games, electronic terminals or consoles, etc.), the casino's electronic signages (e.g., general electronic casino signages, electronic signages associated with single gaming device, electronic signages associated with a (connected) a bank of gaming devices, etc.), casino operator devices (e.g., casino system, accounting system, billing system, player loyalty database, casino announcement controllers, etc.), casino's smart devices (e.g., lighting, power sockets, thermostats, sensors, door locks, etc.), and visitors' electronic devices (e.g., smartphones, smartwatches, fitness trackers, etc.).

The present disclosure allows new gaming features to be enabled, enhancing player's enjoyment and providing new/enhanced gaming systems, which may increase revenue. In embodiments, gaming features (e.g., effects and celebrations may be synced in an immediate area or casino wide. For example, a jackpot or high win of one machine an area triggers win celebration being sent to all connected devices within that area, including overhead signages, back-chair signages, ceiling-light, sounds, etc. The EGM and the other electronic signage are synced based on real-time game events (such as synced jackpot/high win celebration), increasing immersion & jackpot celebration prominence. Additionally, or alternatively, casino overhead lighting may also be used to amplify the effect when a jackpot is triggered on one machine (e.g., stroboscope, dimming, color change, etc.). In another example, the light effect could be triggered to appear to be "moving" towards the winner, drawing everyone's attention to a specific point. In embodiments, lighting and/or noise may be used to attract players to specific gaming machines. For example, when a bank of machines is not being played, digital signage located nearby may be triggered.

In addition to lighting and sounds, the present disclosure makes creating themed areas with synced real-time events based on in-game events quicker and easier. For example, a thermostat may be adjusted to create an atmosphere similar to a game theme (e.g., colder temperatures for winter or warmer temperature for desert or summer themed games).

In embodiments, connected devices may be used for other activities (e.g., microprocessisng, complex calculations, mining crypto currency, clustering game-play data, operating prediction engines, etc.). The present disclosure allows microservices that run on separate EGMs that communicate with each other to accomplish certain tasks (e.g., fraud detection, suspicious player behavior detection, money laundering detection, etc.). etc.). For example, if the connected system detects a certain gaming machine is idle (not in use) the system may use the idle device to perform other operations such as random number generator. In embodiments, the system may also detect device failure and direct other devices to take over operations for a failed device. For example, an EGM is controlling adjacent digital signage, if there is a problem with the EGM, instead of the digital signage freezing or being unresponsive, another connected device may take over control of the digital signage and continue control of the animation, progressive meters, etc.

In embodiments, control lighting, digital signage, etc. may be decentralized; such that if a one or more EGMs and/or other controller fail, the system can detect another available EGM/controller and transfer control to the other device. Devices may have unique identifiers (IDs) assigned to them (e.g., by a main controller) or profile that is then shared with other devices. The unique IDs can be used to transfer messages to specific devices in the system.

In embodiments, the system allows for peer-to-peer connection between devices (e.g., between signage and EGMs, or between EGMs) without the need of a central infrastructure in locations where infrastructure may too expensive, or maintenance is difficult to keep up (e.g., smaller venues/remote locations where the cost of sending a tech is expensive). In embodiments, nodes may need to communicate through other nodes rather than directly. For example, there is a third node "between" the first and the second node and there is no direct connection between the first and the second node, but the first and second node may communicate via the third node.

Another advantage of the present disclosure is the ability to share hardware between devices, which provides a cost reduction of the hardware. For example, a bank of gaming machines can share a printer and/or bill acceptor, rather than each machine having separate components for these gaming operations. In another example, the present disclosure can be used to reduce wiring and/or easier installation (e.g., new components may not need a hardware connection). By replacing hardware connections, the system increases interoperability between competing hardware platforms. For example, a drop-in replacement printer from one company could be used by another machine.

In embodiments, the system may communicate with players' personal devices, a Network Noise Firewall may be used to ensure no one outside of the casino can be connected to the system. For example, a player's smartwatch could be connected to an EGM; the smartwatch tracks the emotional state of the player (e.g., using heart rate) which is, in real-time, reflected by the connected surrounding devices (e.g., lighting/signage pulsates according to player's heart rate to further illustrate how thrilled they are).

In embodiments, a player may use their mobile device to send a request "On which machines can I find game X?" all mesh-connected EGMs that run game X respond immediately (audibly or visually).

In embodiments, the system allows for independence of EGMs location in the casino (system automatically re-configures as devices get moved around the casino).

In other words, the system of the present disclosure can overcome outages (and downtime associated with such outages) and is self-healing based on mesh connectivity.

Figure 1:
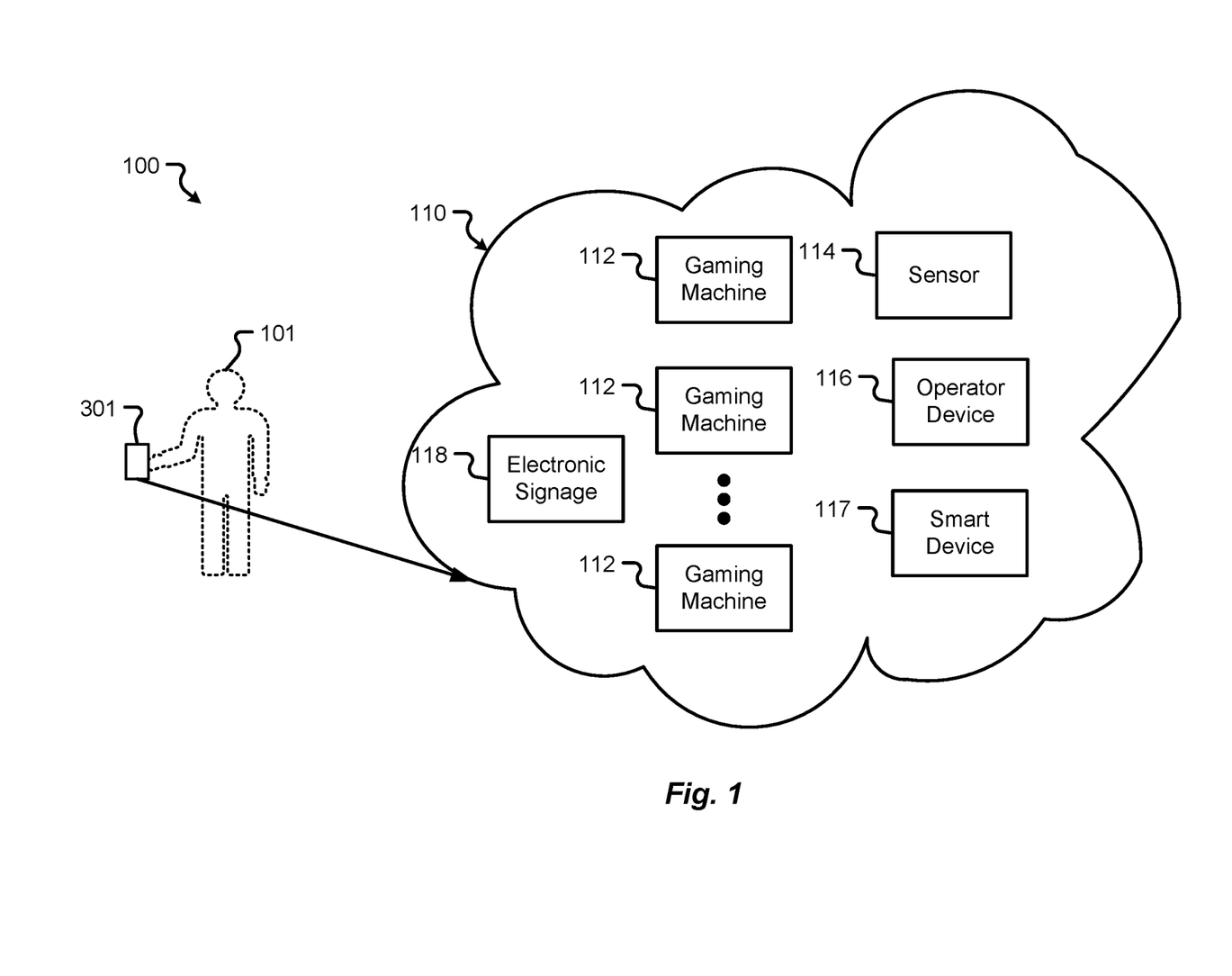
FIG. 1 is a block diagram of a gaming system in accordance with embodiments of the present disclosure.

With reference initially to FIG. 1, details of an illustrative gaming system 100 will be described in accordance with at least some embodiments of the present disclosure. The components of the system 100, while depicted as having particular instruction sets and devices, are not necessarily limited to the examples depicted herein. Rather, a system according to embodiments of the present disclosure may include one, some, or all of the components depicted in the system 100 and does not necessarily have to include all of the components in a single device.

The gaming system 100 is shown to include one or more communication networks 110 that interconnect and facilitate wireless machine-to-machine communications between one or multiple gaming machines 112, one or multiple sensors 114, one or multiple operator devices 116, one or multiple smart devices 117, one or multiple electric signage 118, and other devices not shown.

It should be appreciated that a communication network 110 may correspond to one or many communication networks without departing from the scope of the present disclosure. In some embodiments, the gaming machines 112, sensors 114, operator device 116, smart device 117, and electronic signage 118 may be configured to communicate with each other directly. For example, a gaming machine 112a may send a signal directly to another gaming machine 112b-n and/or to electronic signage 118 to flash associated lighting in response to a jackpot on the gaming machine 112a.

The communication network 110 may comprise any type of known communication medium or collection of communication media and may use any type of protocols to transport messages between endpoints (e.g., devices 112, 114, 166, 117, and 118). The communication network 110 may include wired and/or wireless communication technologies. The Internet is an example of the communication network 110 that constitutes an Internet Protocol (IP) network consisting of many computers, computing networks, and other communication devices located all over the world, which are connected through many telephone systems and other means. Other examples of the communication network 110 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 110 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

In some embodiments, the gaming machines 112 may be distributed throughout a single property or premises (e.g., a single casino floor) or the gaming machines 112 may be distributed among a plurality of different properties. In a situation where the gaming machines 112 are distributed in a single property or premises, the communication network 110 may include some wired connections between network nodes. As a non-limiting example, the nodes of the communication network 110 may communicate with one another using any type of known or yet-to-be developed communication technology. Examples of such technologies include, without limitation, Ethernet, SCSI, PCIe, RS-232, RS-485, USB, ZigBee, Wi-Fi, CDMA, GSM, HTTP, TCP/IP, UDP, etc.

The gaming machines 112 may utilize the same or different types of communication protocols to connect with the communication network 110. It should also be appreciated that the gaming machines 112 may or may not present the same type of game or wagering interface to a player 101. For instance, a first gaming machine 112 may correspond to a gaming machine that presents a slot game to the player 101, the second gaming machine 112 may correspond to a sports betting terminal, and other gaming machines 112 may present other types of games or a plurality of different games for selection and eventual play by a player 101. It may be possible for some of the gaming machines 112 to communicate with one another via a communication network 110.

A gaming machine 112 may correspond to a type of device that enables player interaction in connection with making wagers, communicating, watching live competitive contests, and/or playing games of chance. For instance, the gaming machines 112 may correspond to a type of device that enables a first player 101 to interact with a second player 101 at respective gaming machines 112. In other embodiments, each player 101 may be enabled to play a game individually at a gaming machine 112.

As mentioned above, a gaming machine 112 may include any type of known device such as a slot machine, a sports wagering terminal, an electronic table game (e.g., video poker), a skill-based game, etc. The gaming machine 112 can be in the form of an EGM, virtual gaming machine, video game gambling machine, etc.

The mobile device 301 may correspond to a player's personal device or to a device issued to the player during the player's visit at a particular casino. It should be appreciated that the player 101 may play games directly on their device and/or the mobile device 301 may be in communication with a gaming device 112 such that the mobile device 301 allow the player 101 to add funds to the gaming device 112. As shown in FIG. 1, the mobile device 301 may be in communication with a gaming device and/or POS system via the communication network 110. In embodiments, tailored deals, incentives, information, content, etc. may be sent directly to connected mobile devices. For example, free game play for an EGM may be sent to a user's mobile device based on the user's proximity to the EGM. In another example, deals may be sent to a user's mobile device when it is detected the user may be leaving the gaming establishment. Non-limiting examples of the mobile device 301 include a cellular phone, a smart phone, a tablet, a wearable device, an augmented reality headset, a virtual reality headset, a laptop, a Personal Computer (PC), or the like.

Figure 2:
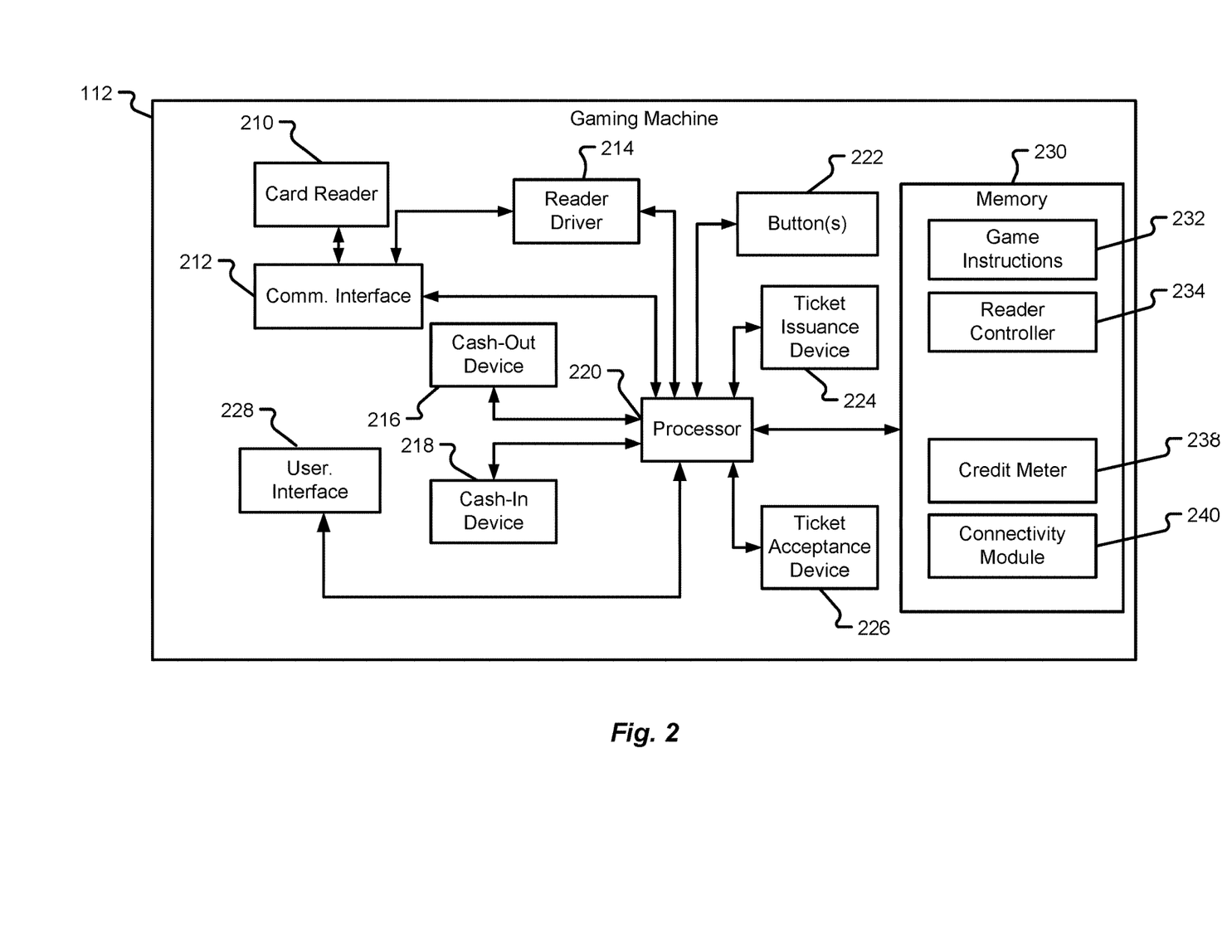
FIG. 2 is a block diagram of an example gaming machine in accordance with embodiments of the present disclosure.

With reference now to FIG. 2, additional details of a gaming machine 112 will be described in accordance with at least some embodiments of the present disclosure. While depicted as a gaming machine 112, it should be appreciated that some or all of the components of a single gaming machine 112 may be distributed across multiple gaming machines 112 (of the same or different type) without departing from the scope of the present disclosure.

The illustrative gaming machine 112 depicted in FIG. 2 is shown to include a card reader 210, a communication interface 212, a reader driver 214, cash out device 216, cash in device 218, a processor 220, buttons 222, ticket issuance device 224, ticket acceptance device 226, and memory 230. The memory 230 stores game instructions 232, reader controller 234, game login instructions 236, credit meter 238, and connectivity module 240. All elements of the gaming machine 112 may be considered to be coupled to one another, regardless of whether or not such coupling is direct or indirect. In other words, "coupling" as used herein does not necessarily require a direct communication between components.

Examples of a suitable communication interface 212 include, without limitation, an Ethernet port, a USB port, an RS-232 port, an RS-485 port, a NIC, an antenna, a driver circuit, a modulator/demodulator, etc. The communication interface 212 may include one or multiple different network interfaces depending upon whether one or multiple network connections are required to facilitate interactions with other systems (not shown). For instance, the gaming machine 112 may be provided with both a wired network interface and a wireless network interface without departing from the scope of the present disclosure. In some embodiments, the communication interface(s) 212 may include different communications ports that interconnect with various input/output lines.

Examples of suitable form factors that may be used for the card include, without limitation, magstripe cards, chip-based cards, contactless/wireless cards, key fobs, mobile communication devices, optically-readable cards, or the like. It should be appreciated that player's cards may be capable of being read by a reader 210 when brought within a predetermined distance of the reader 210 (e.g., if the reader 210 includes an antenna and is utilize a contactless communication protocol like Near Field Communications (NFC) or Bluetooth). Alternatively, or additionally, player's cards may be capable of being read by a reader 210 when inserted to a slot of a card reader 210 or swiped through a card reader 210.

The processor 220 may include one or multiple computer processing devices. In some embodiments, the processor 220 may include a microprocessor, a CPU, a microcontroller, or the like. The processor 220 may also be configured to execute one or more instruction sets stored in memory 230.

The memory 230 may include one or multiple computer memory devices that are volatile or non-volatile. The memory 230 may be configured to store instruction sets that enable player 101 interaction with the gaming machine 112. Examples of instruction sets that may be stored in the memory 230 include a game instruction set 232, a reader controller 234, a game login instruction set 236, a credit meter instruction set 238, and a connectivity module instruction set 240.

While the reader controller 234 is depicted as being provided in memory 230, it should be appreciated that functionality of the reader controller 234 may be provided in whole or in part by the reader driver 214. Thus, the reader controller 234 may be provided in the reader driver 214 without departing from the scope of the present disclosure. The controller 234 can be provided as software instructions, firmware instructions, combinations thereof, or the like.

The game instruction set 232, when executed by the processor 220, may enable the gaming machine 112 to facilitate one or more games of chance or skill and produce interactions between the player 101 and the game of chance or skill. In some embodiments, the game instruction set 232 may include subroutines that present one or more graphics to the player 101 via a user interface 228, subroutines that calculate whether a particular game wager has resulted in a win or loss during the game of chance or skill, subroutines for determining payouts for the player 101 in the event of a win, subroutines for exchanging communications via the communication interface 212, and any other subroutine or set of instructions that facilitate gameplay at or in association with the gaming machine 112.

The reader controller 234, when executed by the processor 220 and/or reader driver 214, may enable functionality of the card reader 210. In some embodiments, the reader controller 234 may be configured to control the card reader 210 to read data from a player's card, register that a card read event has occurred at the card reader 210, extract data from the card during the card read event, and perform other operations in connection with managing the card reader 210.

The credit meter 238 may correspond to a device or collection of devices that facilitates a tracking of wager activity or available wager credits at the gaming machine 112. In some embodiments, the credit meter 238 may be used to store or log information related to various player 101 activities and events that occur at the gaming machine 112. The types of information that may be maintained in the credit meter 238 include, without limitation, player information, available credit information, wager amount information, and other types of information that may or may not need to be recorded for purposes of accounting for wagers placed at the gaming machine 112 and payouts made for a player 101 during a game of chance or skill played at the gaming machine 112. In some embodiments, the credit meter 238 may be configured to track coin-in activity, coin-out activity, coin-drop activity, jackpot paid activity, bonus paid activity, credits applied activity, external bonus payout activity, ticket/voucher in activity, ticket/voucher out activity, timing of events that occur at the gaming machine 112, and the like.

The cash-in device 218 may include a bill acceptor, a coin acceptor, a chip acceptor or reader, or the like. In some embodiments, the cash-in device 218 may also include credit card reader hardware and/or software. The cash-out device 216 may operate and issue cash, coins, tokens, or chips based on an amount indicated within the credit meter 238. In some embodiments, the cash-out device 216 may include a coin tray or the like and counting hardware configured to count and distribute an appropriate amount of coins or tokens based on a player's 101 winnings or available credit within the credit meter 238.

The gaming machine 112 may also be provided with a ticket acceptance device 226 that is configured to accept or scan physically-printed tickets/vouchers and extract appropriate information therefrom. In some embodiments, the ticket acceptance device 226 may include one or more machine vision devices (e.g., a camera, IR scanner, optical scanner, barcode scanner, etc.), a physical ticket acceptor, a shredder, etc. The ticket acceptance device 226 may be configured to accept physical tickets and/or electronic tickets without departing from the scope of the present disclosure. An electronic ticket/voucher may be accepted by scanning a one-dimensional barcode, two-dimensional barcode, or other type of barcode or quick response (QR) code displayed by a player's 101 mobile communication device 301, for example.

The ticket issuance device 224 may be configured to print or provide physical tickets/vouchers to players 101. In some embodiments, the ticket issuance device 224 may be configured to issue a ticket/voucher consistent with an amount of credit available to a player 101, possibly as indicated within the credit meter 238.

The button(s) 222 may correspond to any type of mechanical or software-based input device. In some embodiments, the button(s) 222 may be provided on a common panel or portion of the gaming machine 112 and may be used to initiate a predetermined function in response to being pressed by the player 101. A button 222, as can be appreciated, may alternatively or additionally take the form of one or more depressible buttons, a lever or "one armed bandit handle," etc. A button 222 may include one or more mechanically-actuatable components or may correspond to a predetermined area of a display that is configured to receive a user input.

Figure 3:
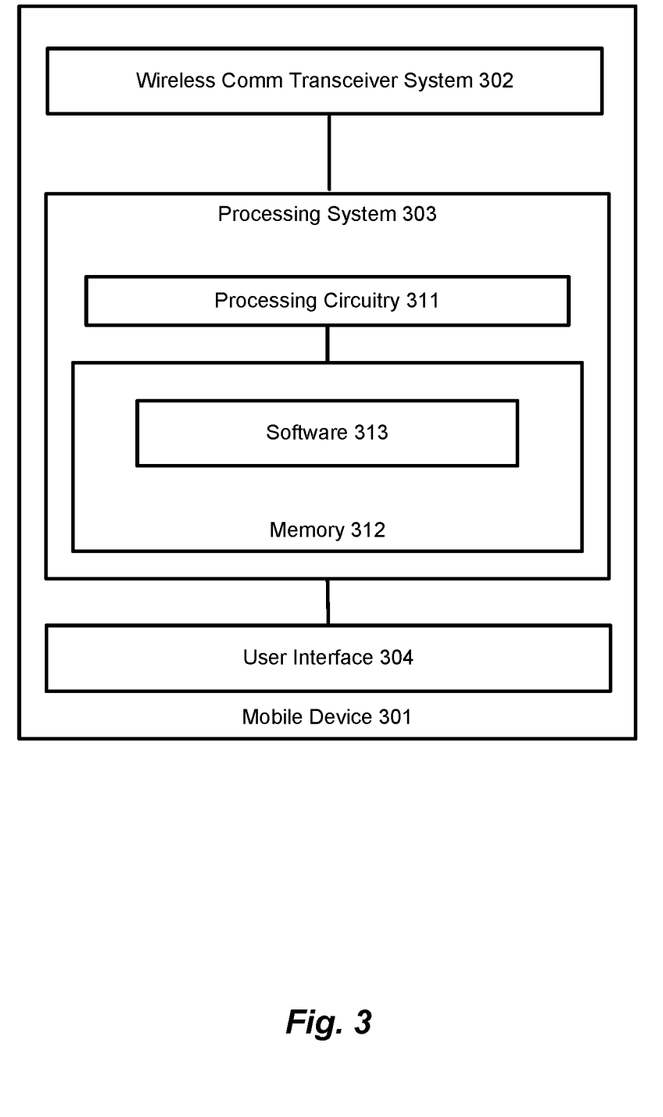
FIG. 3 is a block diagram of a mobile device in accordance with embodiments of the present disclosure.

With reference now to FIG. 3, a mobile device 301 in accordance with at least some embodiments of the present disclosure. In some embodiments, the mobile device 301 may connect to gaming device 112 in accordance with the present disclosure. Mobile device 301 comprises wireless communication transceiver system 302, processing system 303, and user interface 304. Processing system 303 is linked to wireless communication transceiver system 302 and user interface 304. Processing system 303 includes processing circuitry 311 and memory 312 that stores operating software 313. Mobile device 301 may include other well-known components such as a battery and enclosure that are not shown for clarity. Mobile device 301 may be a cellular phone, mobile phone, smartphone, personal digital assistant (PDA), computer, laptop, tablet, e-book, mobile Internet appliance, media player, game console, wearable computing device, wireless network interface card, or some other wireless communication apparatus—including combinations thereof.

Wireless communication transceiver system 302 comprises RF communication circuitry and an antenna. The RF communication circuitry typically includes an amplifier, filter, RF modulator, and signal processing circuitry. Wireless communication transceiver system 302 may also include memory, software, processing circuitry, or some other communication device. Wireless communication transceiver system 302 may use various communication formats, such as LTE, CDMA, EVDO, WIMAX, GSM, WIFI, HSPA, or some other wireless communication format—including combinations thereof.

User interface 304 comprises components that interact with a user to receive user inputs and to present media and/or information. User interface 304 may include a speaker, microphone, buttons, lights, display screen, touch screen, touch pad, scroll wheel, communication port, or some other user input/output apparatus—including combinations thereof. User interface 304 may be omitted in some examples.

Processing circuitry 311 comprises microprocessor and other circuitry that retrieves and executes software 313 from memory 312. Memory 312 comprises a non-transitory storage medium, such as a disk drive, flash drive, data storage circuitry, or some other memory apparatus. Processing circuitry 311 is typically mounted on a circuit board that may also hold memory device 312, portions of wireless communication transceiver system 302, and user interface 304. Software 313 comprises computer programs, firmware, or some other form of machine-readable processing instructions. Software 313 may include an operating system, utilities, drivers, network interfaces, applications, or some other type of software.

When executed, software 313 directs processing system 303 to operate as described herein to allow the mobile device 301 to be in direct communication with other devices, such as devices 112, 114, 116, 117, and 118.

Figure 4:
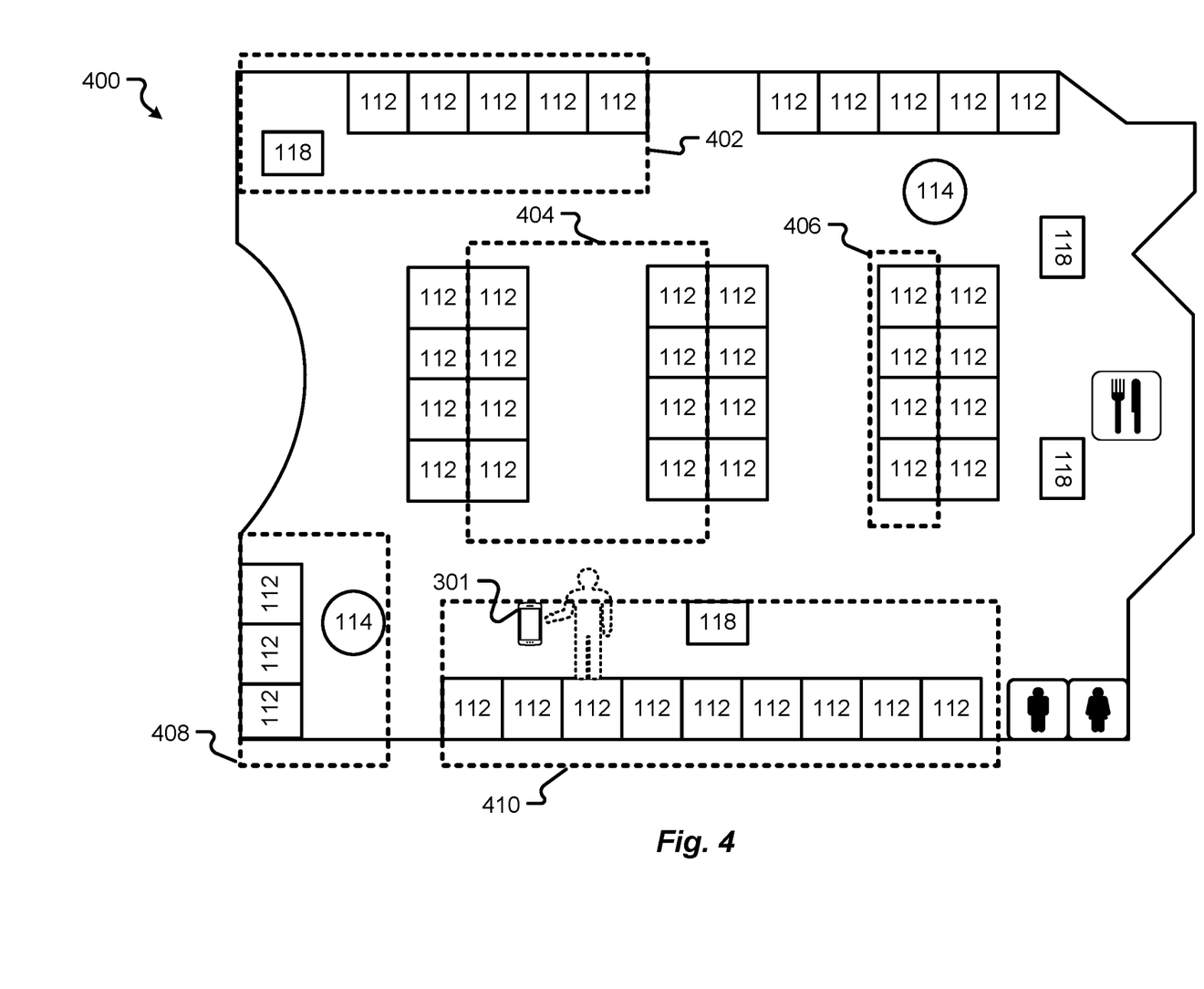
FIG. 4 is a block diagram depicting an illustrative example of a casino floor plan in accordance with embodiments of the present disclosure.

With reference now to FIG. 4, an illustrative casino floor plan 400 is depicted. The casino floor plan 400 includes gaming machines 112 sensors 114, and electronic signage 118 placed in various locations. The devices (e.g., device 112, 114, 118, etc.) may be grouped (e.g., by location or type) into connected device regions 402, 404, 406, 408, and 410. For example, devices may communicate with other devices in the same region 402, 404, 406, 408, and 410.

Additionally, a player's mobile device 301 may be added to a connected device region based on location of the device 301. In this illustrated example, the device 301 is connected to region 410.

For example, if the player wins a jackpot on a gaming device in the region 410, the other gaming devices 112 may emit lighting and/or sounds. In another example, gaming device 112 in the region 402 may control signage 118 in the same region. In yet another example, a sensor 114 (e.g., a thermostat) may be controlled by any/all of the gaming devices 112 in the region 408.

Figure 5:
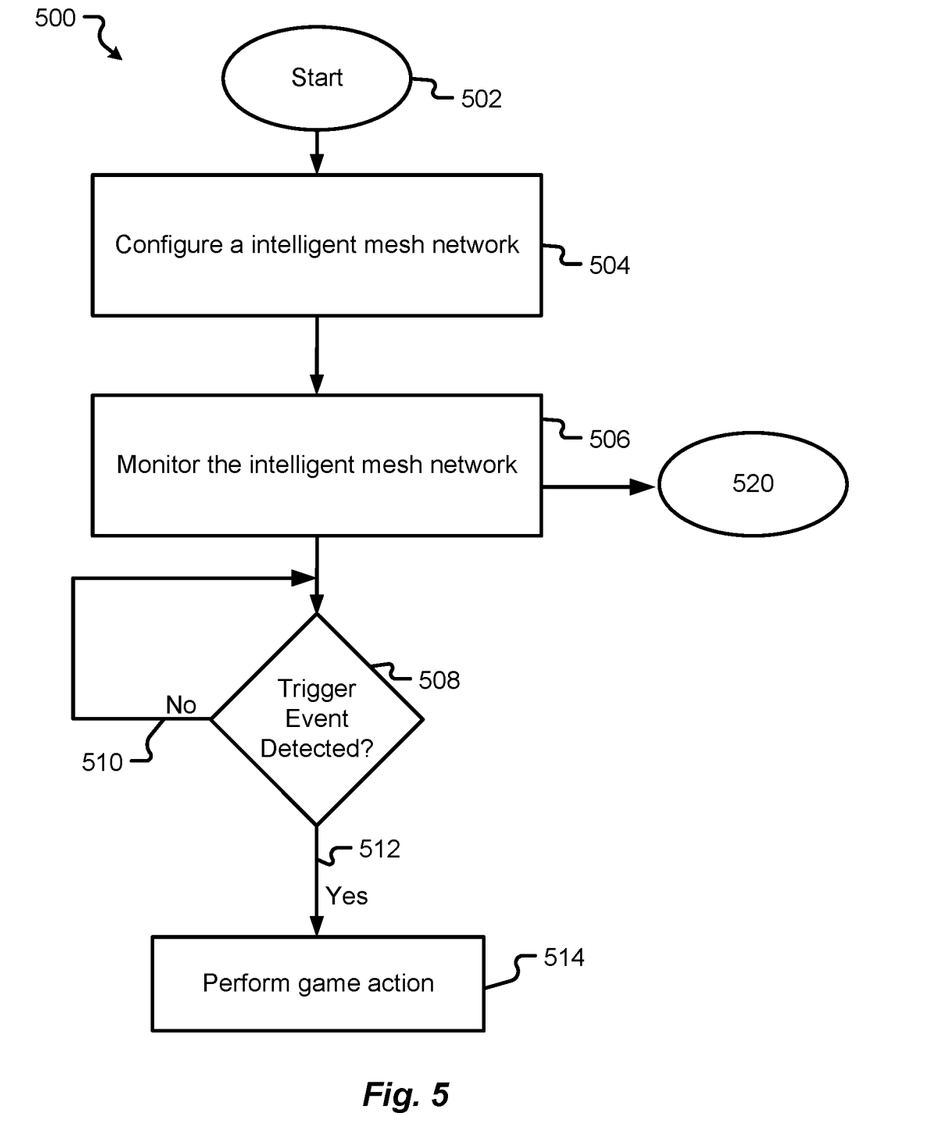
FIG. 5 is a flow diagram depicting a process of managing many-to-many-connectivity of devices in accordance with embodiments of the present disclosure.

With reference now to FIG. 5, a process 500 of many-to-many connectivity will be described in accordance with at least some embodiments of the present disclosure.

The order of operations depicted in FIG. 5 should not be construed as limiting embodiments of the present disclosure. For instance, certain steps may be performed in a different order without departing from the scope of the present disclosure. Furthermore, some steps may be performed in parallel (e.g., simultaneously) with one another.

The process 500 starts at step 502. In step 504 the intelligent mesh network is configured by connecting a plurality of nodes, such that the plurality of nodes are able to communicate directly with each other. In step 506, the intelligent mesh network is monitored for trigger events (e.g., device failures, idle devices, jackpots, etc.). In step 508, the system determines if a trigger event (e.g., in-game event) is detected. If a trigger event is not detected (no) in step 510, the system continues to monitor for a trigger event. If a trigger event is detected (yes) in step 512, an action is performed. For example, lighting and/or sounds of adjacent devices is triggered.

Figure 6:
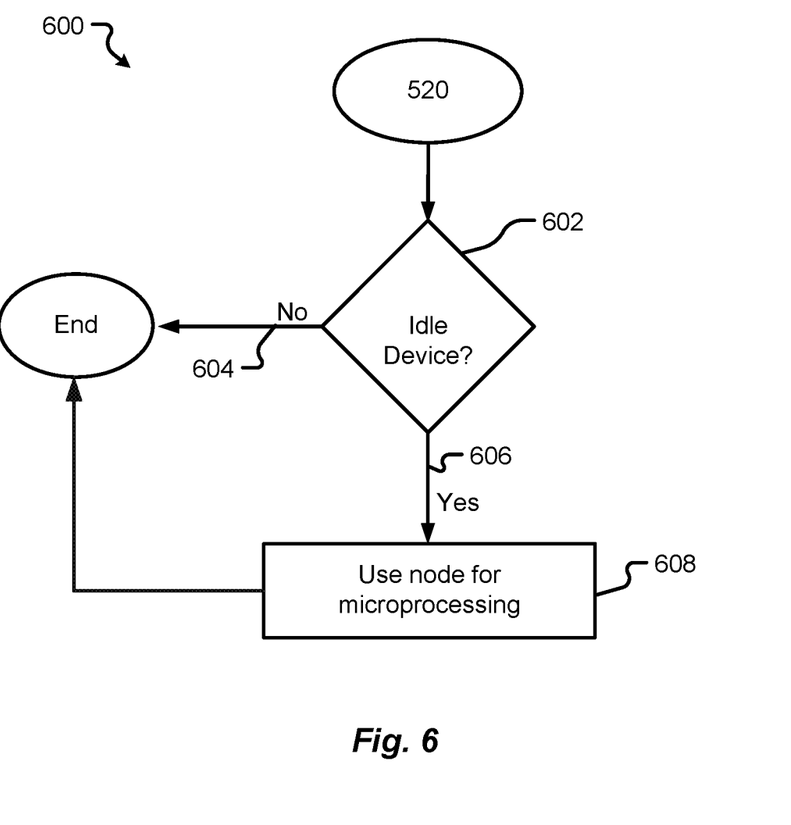
FIG. 6 is a flow diagram depicting a process of managing many-to-many-connectivity of devices in accordance with embodiments of the present disclosure.

With reference now to FIG. 6, a process 600 which continues from step 520 in the process 500 will be described in accordance with at least some embodiments of the present disclosure.

The order of operations depicted in FIG. 6 should not be construed as limiting embodiments of the present disclosure. For instance, certain steps may be performed in a different order without departing from the scope of the present disclosure. Furthermore, some steps may be performed in parallel (e.g., simultaneously) with one another.

From step 506, while monitoring the system, the system determines if there is an idle device (step 602). If there is no idle device detected (step 604), the process 600 ends. If there is an idle device detected (step 606) the idle device is used for microprocessing (step 608).

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The invention is claimed as follows:

1. A method of operating an intelligent mesh network, the method comprising:
configuring the intelligent mesh network, wherein the intelligent mesh network comprises a plurality of nodes, and wherein the plurality of nodes are able to communicate directly with each other;
detecting an in-game event on a first node in the intelligent mesh network;
in response to detecting the in-game event, performing an action on a second node, wherein the action is associated with the in-game event, and wherein the second node is in a location near a location of the first node;
detecting at least one node of the plurality of nodes is not in use; and
using the at least one node not in use for microprocessing.

2. The method according to claim 1, wherein a node comprises an electronic gaming machine, electronic signage, an operator device, or a sensor.

3. The method according to claim 1, wherein the first node comprises an electronic gaming machine, wherein the in-game event comprises a jackpot on the electronic gaming machine, and wherein performing the action in response to detecting the jackpot on the electronic gaming machine comprises activating lights and/or speakers on adjacent electronic gaming machines.

4. The method according to claim 1, wherein the microprocessing comprises a random number generator.

5. The method according to claim 1, further comprising:
detecting failure of a node; and
shifting functions performed by the failed node to a backup node.

6. The method according to claim 1, wherein each node on the intelligent mesh network has a respective view of the intelligent mesh network.

7. The method according to claim 1, further comprising:
detecting a location of a mobile device; and
performing a second action on a static node that is near the location of the mobile device.

8. The method according to claim 1, wherein performing the action in response to detecting the in-game event comprises performing the action on other nodes in the location near the first node associated with the in-game event.

9. The method of claim 1, wherein the plurality of nodes comprise secure nodes and unsecure nodes, and wherein the secure nodes are configured to limit permissions to the secure nodes by the unsecure nodes.

10. The method of claim 1, wherein the plurality of nodes comprise secure nodes and unsecure nodes, and wherein the secure nodes have different permissions within the intelligent mesh network than the unsecure nodes.

11. A system comprising:
a processor; and
a memory coupled with and readable by the processor and storing therein a set of instructions which, when executed by the processor, cause the processor to:
configure an intelligent mesh network, wherein the intelligent mesh network comprises a plurality of nodes, and wherein each of the plurality of nodes is able to communicate directly with other nodes in the plurality of nodes;
detect an in-game event on a first node in the intelligent mesh network;
in response to detecting the in-game event, perform an action on a second node near the first node, wherein the action is associated with the in-game event;
detect at least one node of the plurality of nodes is idle; and
use the at least one idle node for microprocessing.

12. The system according to claim 11, wherein a node comprises an electronic gaming machine, electronic signage, an operator device, or a sensor.

13. The system according to claim 11, wherein nodes may be grouped in a node group based on geographic location, and wherein the intelligent mesh network may treat each node group as an individual node.

14. The system according to claim 11, wherein the microprocessing comprises a random number generator.

15. The system according to claim 11, further comprising: detecting a failure of a node; and
shifting functions performed by the failed node to a backup node.

16. The system according to claim 11, wherein each node on the intelligent mesh network has a respective view of the intelligent mesh network.

17. The system according to claim 11, further comprising: detecting a location of a mobile device; and
performing a second action on a static node that is near the location of the mobile device.

18. A controller for an intelligent mesh network, comprising:
a processor; and
a memory coupled with and readable by the processor and storing therein a set of instructions which, when executed by the processor, cause the processor to:
detect at least one node of a plurality of nodes is idle; and
use the at least one idle node for microprocessing.

19. The controller of claim 18, further comprising a set of instructions which, when executed by the processor, cause the processor to:
detect an in-game event on a first node in the intelligent mesh network; and in response to detecting the in-game event on the first node, perform an action on a second node, wherein the first node comprises an electronic gaming machine, wherein the in-game event comprises a jackpot on the electronic gaming machine, and wherein performing the action in response to detecting the jackpot on the electronic gaming machine comprises activating lights and/or speakers on the second node.

20. The controller of claim 18, wherein the microprocessing comprises a random number generator.

* * * * *